(12) United States Patent
Ji et al.

(10) Patent No.: US 11,870,055 B2
(45) Date of Patent: *Jan. 9, 2024

(54) SURFACE-FLUORINATED SILICON-CONTAINING ELECTRODES

(71) Applicant: Enevate Corporation, Irvine, CA (US)

(72) Inventors: Liwen Ji, San Diego, CA (US);
Benjamin Yong Park, Mission Viejo, CA (US); Robert A. Rango, Irvine, CA (US); Dong Sun, Irvine, CA (US); Frederic C. Bonhomme, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/161,333

(22) Filed: Jan. 28, 2021

(65) Prior Publication Data

US 2021/0159485 A1 May 27, 2021

Related U.S. Application Data

(63) Continuation of application No. 16/430,298, filed on Jun. 3, 2019, now Pat. No. 10,916,763.

(51) Int. Cl.
| | |
|---|---|
| *H01M 4/134* | (2010.01) |
| *H01M 4/36* | (2006.01) |
| *H01M 4/04* | (2006.01) |
| *H01M 4/02* | (2006.01) |

(52) U.S. Cl.
CPC .......... *H01M 4/134* (2013.01); *H01M 4/044* (2013.01); *H01M 4/049* (2013.01); *H01M 4/366* (2013.01); *H01M 2004/027* (2013.01)

(58) Field of Classification Search
CPC .... H01M 4/134; H01M 4/1395; H01M 4/386; H01M 4/58; H01M 4/62; H01M 2004/027

See application file for complete search history.

(56) References Cited

U.S. PATENT DOCUMENTS

| | | | |
|---|---|---|---|
| 2008/0032197 A1* | 2/2008 | Horpel | H01M 10/052 429/231.8 |
| 2011/0027658 A1 | 2/2011 | Kim et al. | |
| 2013/0069601 A1* | 3/2013 | Coowar | H01M 10/0567 320/162 |
| 2013/0323595 A1 | 12/2013 | Sohn et al. | |
| 2015/0243973 A1* | 8/2015 | Newbound | B05D 1/40 429/218.1 |
| 2016/0260967 A1 | 9/2016 | Matus et al. | |
| 2016/0285080 A1 | 9/2016 | Yokoyama | |
| 2016/0365607 A1 | 12/2016 | Yokoyama | |
| 2018/0069233 A1 | 3/2018 | Matus et al. | |
| 2018/0097229 A1* | 4/2018 | Jo | H01M 4/62 |
| 2018/0309169 A1 | 10/2018 | Yang et al. | |
| 2019/0131626 A1 | 5/2019 | Wang et al. | |
| 2019/0288273 A1 | 9/2019 | Yang et al. | |

* cited by examiner

*Primary Examiner* — Scott J. Chmielecki
(74) *Attorney, Agent, or Firm* — McAndrews, Held & Malloy, Ltd.

(57) ABSTRACT

The present application describes the use of a solid electrolyte interphase (SEI) fluorinating precursor and/or an SEI fluorinating compound to coat an electrode material and create an artificial SEI layer. These modifications may increase surface passivation of the electrodes, SEI robustness, and structural stability of the silicon-containing electrodes.

26 Claims, 9 Drawing Sheets

SURFACE-FLUORINATED SILICON-CONTAINING ELECTRODES

CROSS-REFERENCE TO RELATED APPLICATIONS

This application is a continuation of and claims the benefit of U.S. application Ser. No. 16/430,298 filed Jun. 3, 2019, pending (now allowed). The entirety of the above referenced application is hereby incorporated by reference.

BACKGROUND

Field

The present application relates generally to silicon particles. In particular, the present application relates to silicon particles and materials including silicon particles for use in battery electrodes.

Description of the Related Art

A lithium-ion (Li-ion) battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into jelly rolls or stacks. The jelly rolls or stacks are of alternating electro-chemically active materials (electrodes) with the separator between them.

Silicon (Si) is well known as one of the most promising anode materials for Li-ion batteries owing to its low discharge potential ($\leq 0.4$V vs Li/Li$^+$) and high theoretical gravimetric capacity (3579 mAh/g at room temperature). In addition, Si is very abundant on earth. However, the practical use of Si anodes in Li-ion batteries may be hindered by poor performance resulting from low intrinsic electrical conductivity and a large volume expansion (up to 300%). Local strain can pulverize Si at the particle level and deteriorate their physical/electrical contact with both the charge carrier and current collector at the electrode level. Furthermore, the severe compression/tensile stress, upon the expansion/contraction of Li—Si alloy, can rupture the solid electrolyte interphase (SEI) layer formed at the electrode surface. Subsequently, freshly opened Si cracks can be exposed to the electrolyte, and as a result the capacity, rate capability and coulombic efficiency (CE) of the batteries can deteriorate upon sustained cycling.

As a boundary between Si active material and electrolyte medium, the electrode interface can play an important role in the performance of the electrochemical system. This interface can not only be the starting point for Li permeation into Si, but can also be where many of the side reactions responsible for the SEI formation take place. The naturally formed SEI layer is typically inhomogeneous in nature, suffers from partial detachment during cycling and irreversibly consumes some charge for electrolyte reduction during the first cycle.

Surface modifications can affect the electrochemical processes in Li-ion batteries by modifying the mechanisms of SEI formation. However, much of the existing work on Si anodes does not meet the requirements for commercial applications because of unsatisfactory performances and serious challenges associated with cost and scale-up.

SUMMARY

Various implementations include a method of preparing an electrode. The method can include providing an electrode material comprising silicon and exposing the electrode material to a solid electrolyte interphase (SEI) fluorinating precursor and/or an SEI fluorinating compound. The method can also include forming a fluorine-containing layer on the electrode material via a chemical reaction with the SEI fluorinating precursor and/or the SEI fluorinating compound.

In some implementations, the method can further comprise forming the electrode material into the electrode. The electrode material can comprise the silicon as Si particles. The Si particles can have an average particle size between 1 µm and 50 µm. In some instances, the electrode material can comprise the electrode.

In some implementations, the method can further comprise activating the electrode material. For example, activating the electrode material can comprise exposing the electrode material to a coupling reagent. The coupling reagent can comprise [3-(2-Aminoethylamino)propyl] trimethoxysilane (AEAPTMS). In some instances, the electrode material is activated and is subsequently exposed to the SEI fluorinating precursor. In some instances, the electrode material is activated and is subsequently exposed to the SEI fluorinating compound.

In some implementations, the SEI fluorinating precursor and/or the SEI fluorinating compound can comprise a metal fluoride compound, a fluorine doped metal oxide compound, a fluoropolymer, a Nafion compound, a Li ion exchanged Nafion compound, hexafluorosilicic acid, a fluorinated organophosphine compound, a fluoride molten salt, a fluoride ion solution, $XeF_2$, $F_2$, $SiF_4$, $CF_4$, $Ar/F_2$, or a combination thereof. For example, the SEI fluorinating precursor can comprise $Al(NO_3)_3 \cdot 9H_2O$ and $NH_4F$. As another example, the metal fluoride compound can comprise LiF, $AlF_3$, $CuF_2$, $FeF_3$, $TiF_3$, $FeF_2$, $NiF_2$, $CoF_3$, $CoF_2$, $MnF_2$, $AgCuF_3$, $BiF_3$, $VF_3$, $NbF_5$, or a combination thereof. In some instances, the metal fluoride compound can comprise $AlF_3$. As another example, the fluorine doped metal oxide compound can comprise $TiO_xF_y$, $SnOxFy$, FeOF, $WO_{(3-x)}F_x$, fluorine doped $SnO_2$, fluorine doped ZnO, or a combination thereof. As another example, the SEI fluorinating precursor can comprise a complex of glyme and LiF.

In some implementations, exposing the electrode material to the SEI fluorinating precursor and/or the SEI fluorinating compound can comprise exposure to a solution, electrolysis, exposure to a gas, exposure to a plasma, photochemical synthesis, electrochemical synthesis, magnetron sputtering deposition, or atomic layer deposition. For example, the electrode material can be exposed to a solution.

In some implementations, the electrode can comprise Si dominant electrochemically active material. For example, the electrochemically active material can comprise the silicon at about 70% to about 100% by weight.

In some implementations, the electrode can be an anode. In some instances, the electrode can comprise a Si-composite electrochemically active film. In some instances, the electrode can comprise a self-supported film.

Various implementations can include an electrode. The electrode can include a silicon-dominant electrochemically active material and a fluorine-containing layer. For example, the electrochemically active material can comprise silicon at about 70% to about 100% by weight.

In some implementations, the electrochemically active material can comprise silicon particles, and the silicon particles can be coated with the fluorine-containing layer. In some instances, the silicon particles can have an average particle size between 1 μm and 50 μm. In some implementations, the electrochemically active material can comprise a film, and the film can be coated with the fluorine-containing layer.

In some implementations, the layer can comprise a metal fluoride compound, a fluorine doped metal oxide compound, a Nafion compound, or a combination thereof. For example, the metal fluoride compound can comprise LiF, $AlF_3$, $CuF_2$, $FeF_3$, $TiF_3$, $FeF_2$, $NiF_2$, $CoF_3$, $CoF_2$, $MnF_2$, $AgCuF_3$, $BiF_3$, $VF_3$, $NbF_5$, or a combination thereof. In some instances, the metal fluoride compound can comprise $AlF_3$. As another example, the fluorine doped metal oxide compound can comprise $TiO_xF_y$, $SnO_xF_y$, FeOF, $WO_{(3-x)}F_x$, fluorine doped $SnO_2$, fluorine doped ZnO, or a combination thereof.

In some implementations, the electrode can comprise an anode. In some instances, the electrode can comprise a Si-composite electrochemically active film. In some instances, the electrode can comprise a self-supported film.

Various implementations can include an electrochemical device. The device can include such an anode, a cathode, and an electrolyte. In some instances, the cathode can comprise lithium. In some instances, the electrolyte can comprise fluoroethylene carbonate (FEC), ethyl methyl carbonate (EMC), dimethyl carbonate (DMC), diethyl carbonate (DEC), propylene carbonate (PC), or a mixture thereof. For example, the electrolyte can comprise greater than or equal to about 10 wt % FEC, EMC, DMC, DEC, PC, or a mixture thereof. In some instances, the electrolyte can comprise about 30 wt % FEC and about 70 wt % EMC. In some instances, the electrolyte does not comprise ethylene carbonate (EC). In some instances, the electrolyte can comprise $LiPF_6$. For example, the electrolyte can comprise the $LiPF_6$ at a concentration of about 1 M to about 1.2 M. In some instances, the cathode can comprise $LiCoO_2$. In some instances, the cathode can comprise Nickel-Cobalt-Manganese (NCM), Nickel-Cobalt-Aluminum (NCA), or a combination thereof. The electrochemical device can be a battery.

Various implementations can include an electrode. The electrode can include an electrode material comprising an electrochemically active film. The film can comprise silicon. The electrode can also comprise a fluorine-containing layer coated on the film. In some instances, the film can comprise silicon-dominant electrochemically active material. For example, the silicon-dominant electrochemically active material can comprise silicon at about 70% to about 100% by weight.

In some implementations, the layer can comprise a metal fluoride compound, a fluorine doped metal oxide compound, a Nafion compound, or a combination thereof. For example, the metal fluoride compound can comprise LiF, $AlF_3$, $CuF_2$, $FeF_3$, $TiF_3$, $FeF_2$, $NiF_2$, $CoF_3$, $CoF_2$, $MnF_2$, $AgCuF_3$, $BiF_3$, $VF_3$, $NbF_5$, or a combination thereof. In some instances, the metal fluoride compound can comprise $AlF_3$. As another example, the fluorine doped metal oxide compound can comprise $TiO_xF_y$, $SnO_xF_y$, FeOF, $WO_{(3-x)}F_x$, fluorine doped $SnO_2$, fluorine doped ZnO, or a combination thereof.

In some implementations, the electrode can be an anode. In some instances, the film can comprise a Si-composite electrochemically active film. In some instances, the electrochemically active film is a self-supported film.

Various implementations can include an electrochemical device. The electrochemical device can include such an anode, a cathode, and an electrolyte. In some instances, the cathode can comprise lithium. In some instances, the electrolyte can comprise fluoroethylene carbonate (FEC), ethyl methyl carbonate (EMC), dimethyl carbonate (DMC), diethyl carbonate (DEC), propylene carbonate (PC), or a mixture thereof. For example, the electrolyte can comprise greater than or equal to about 10 wt % FEC, EMC, DMC, DEC, PC, or a mixture thereof. In some instances, the electrolyte can comprise about 30 wt % FEC and about 70 wt % EMC. In some instances, the electrolyte does not comprise ethylene carbonate (EC). In some instances, the electrolyte can comprise $LiPF_6$. For example, the electrolyte can comprise the $LiPF_6$ at a concentration of about 1 M to about 1.2 M. In some instances, the cathode can comprise $LiCoO_2$. In some instances, the cathode can comprise Nickel-Cobalt-Manganese (NCM), Nickel-Cobalt-Aluminum (NCA), or a combination thereof. The electrochemical device can be a battery.

DETAILED DESCRIPTION

Figure 1:
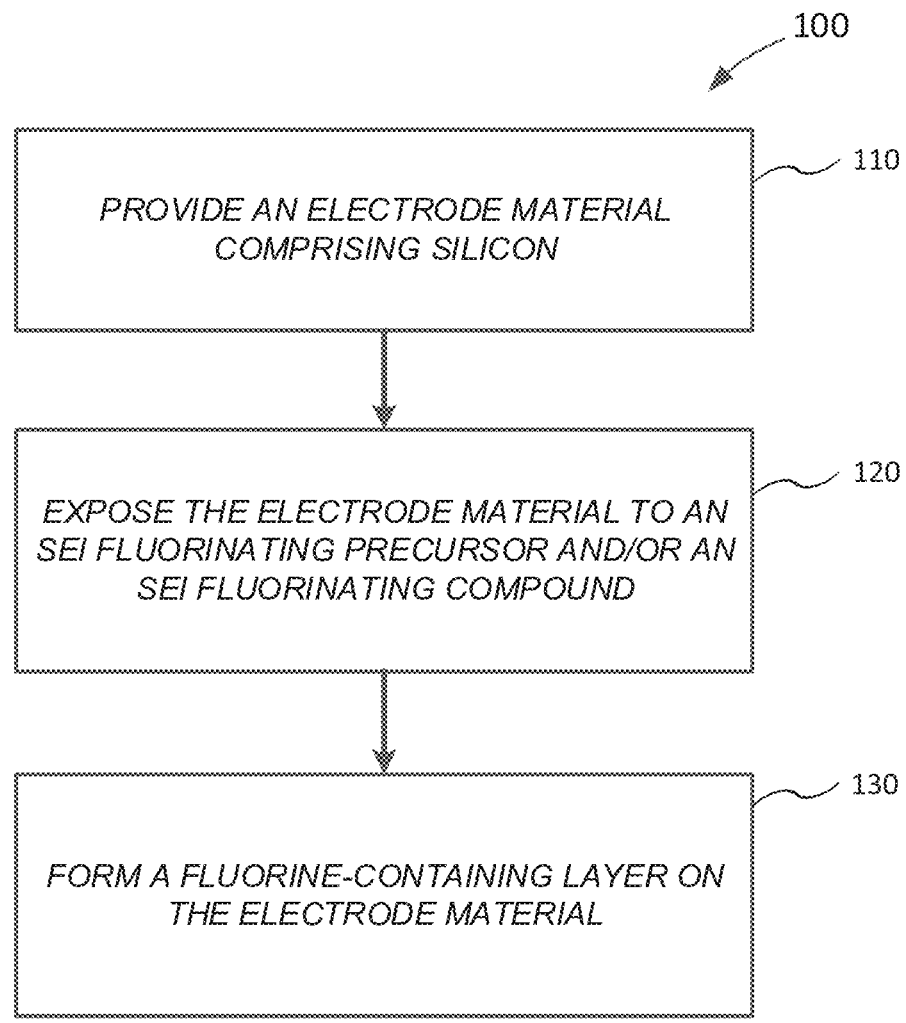
FIG. 1 depicts an example method of preparing an electrode in accordance with certain embodiments described herein.

This application describes certain embodiments of silicon material that may be used as electrochemically active material in electrodes (e.g., anodes and cathodes) in electrochemical cells. Silicon can be a potentially high energy per unit volume host material, such as for lithium ion batteries. For example, silicon has a high theoretical capacity and can increase the energy density of lithium ion batteries compared with lithium ion batteries using other active materials such as graphite. However, silicon can swell in excess of 300% upon lithium insertion. Accordingly, batteries with silicon anodes may exhibit more rapid capacity loss upon cycling compared with batteries with graphite anodes. The repeat expansion and contraction of silicon particles during charge and discharge can lead to mechanical failure of the anode during cycling. Mechanical failure can expose new surfaces of silicon which can react with the electrolyte, irreversibly incorporating Li-ions in the solid electrolyte interface/interphase (SEI), and leading to capacity loss. Certain embodiments described herein can include silicon material with a modified surface, leading to improved cycling performance. For example, some embodiments can provide a SEI with increased stability (e.g., a substantially stable SEI and/or a stable SEI in some instances) to improve the capacity retention during cycling.

To overcome the current obstacles associated with developing high-energy Li-ion full-cells with Si-based electrodes, the present application describes the use of an SEI fluorinating precursor and/or an SEI fluorinating compound and surface modification of Si material (e.g., powders, particles, fibers, etc.) and electrodes. Surface modification can create an artificial SEI layer with interfacial features that may help enhance the dispersion of Si, minimize surface area, and improve interfacial kinetics and the coulombic efficiency upon cycling of the corresponding Si-containing electrodes in Li-ion batteries.

Generally, a stable passivating SEI layer that tolerates and/or recovers rapidly when damaged by the changes in the electrode volume can improve its lifetime and reduce irreversible charge loss. At the same time, this SEI layer may allow for a fast Li ion transfer between the electrode-electrolyte interfaces.

In this regard, fluorine-containing layers may be more stable and may be much less prone to be reduced by a radical attack. Without being bound by theory, if the outer layer of the Si material or Si containing-electrode contains an electrochemically stable fluorine-containing species, the SEI growth rate may be significantly reduced. In addition, the existence of electronegative fluorine groups may lead to a high reduction potential that causes the species to react first upon first charge during formation. The species, upon reduction, may be electrochemically stable and form a stable SEI layer. The fluorine-containing layer could also act as an artificial matrix, enhancing the mechanical strength and electrochemical stability of a Si containing-electrode.

In some implementations, the Si coated with a fluorine-containing layer can be mixed with binder in a solvent and coated onto a current collector. For example, the Si coated with a fluorine-containing layer may be used as the active material in powder form. The binder and current collector may be any of those known in the art or yet to be developed. For example, the current collector may be a copper or nickel foil. In some instances, conductive particles (e.g., carbon) may be added.

In some implementations, the coated Si powders can be used to prepare film-based electrodes. For example, some composite material films can be monolithic, self-supporting structures using pyrolyzed polymer, e.g., as described in U.S. patent application Ser. No. 13/008,800 (U.S. Pat. No. 9,178,208), entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes;" or U.S. patent application Ser. No. 13/799,405 (U.S. Pat. No. 9,553,303), entitled "Silicon Particles for Battery Electrodes," each of which is incorporated by reference herein. In some embodiments, the self-supported composite material film can be used as an electrode (e.g., without a current collector).

Some composite material films may be provided on a current collector to form an electrode. In some embodiments, the composite material film can be attached to a current collector using an attachment substance. The attachment substance and current collector may be any of those known in the art or yet to be developed. For example, some composite material films can be provided on a current collector as described in U.S. patent application Ser. No. 13/333,864 (U.S. Pat. No. 9,397,338), entitled "Electrodes, Electrochemical Cells, and Methods of Forming Electrodes and Electrochemical Cells;" or U.S. patent application Ser. No. 13/796,922 (U.S. Pat. No. 9,583,757), entitled "Electrodes, Electrochemical Cells, and Methods of Forming Electrodes and Electrochemical Cells, each of which is incorporated by reference herein. Some composite material films may be formed on a current collector, e.g., as described in U.S. patent application Ser. No. 15/471,860, filed Mar. 28, 2017, and published on Oct. 4, 2018 as U.S. Patent Application Publication No. 2018/0287129, entitled "Methods of Forming Carbon-Silicon Composite Material on a Current Collector," which is incorporated by reference herein.

In some embodiments, disclosed are surface modifications or surface coating of fluorine-containing material on Si material used to fabricate Si-containing (e.g., Si-dominant) electrodes (e.g., anodes). These so-called "surface fluorination" strategies may be used to form a homogeneous and a dense fluorine-containing thin layer (or phase) on Si particles or the subsequently prepared Si-containing electrodes.

Surface fluorination layers may serve as a chemically stable and mechanically strong interphase, which reduce and/or minimize the reductive reaction of carbonate electrolytes and other solvents, and reduce and/or suppress the direct contact between a Si containing-electrode and other solvent, and therefore may enhance electrochemical stability of a Si containing-electrode. Surface fluorination may also help modify the SEI layer composition and improve the SEI stability on the surface of Si-containing electrodes, which increase surface passivation of the electrodes, increase SEI robustness, and increase structural stability of the Si-containing electrodes. Furthermore, surface fluorination may help increase the electrical conductivity and ease the ionic conduction during Li—Si alloy reaction. Surface fluorination may also help dissipate the mechanical stress associated with volume expansion of Si. Therefore, surface fluorination strategies could bring huge benefit to Si-based Li-ion batteries and contribute to improving electrochemical performance greatly. In some implementations, one or more surface fluorination layers may form a stable SEI layer during cycling due to the mechanical strength and chemical nature of the fluorine species layer, and therefore could have improved cycling performance, excellent rate capability, and reduced volume expansion.

In some embodiments, coating a thin layer of a fluoride compound, for example $AlF_3$, on the surface of Si through chemical reactions is described. This layer may act as an artificial defensive matrix and may increase the stability of $Li_xSi$ in prolonged cycling processes. Therefore, it may bring many benefits to the overall electrochemical performance for the corresponding Si containing-electrodes (e.g., anodes in Li-ion batteries).

Coating of the Si material or electrode may be performed by numerous methods, for example: (i) $AlF_3$ may be used to coat the surface of micro-size Si powder (e.g., Si powder having an average particle size between 1 μm and 50 μm). The $AlF_3$ coated Si powder may be used to prepare Si-containing electrodes, e.g., using carbonized polymer. The $AlF_3$ coated micro-size Si powder may also be directly used as active materials to fabricate Si-based electrodes for Li-ion batteries through direct coating methods; (ii) Si-containing electrodes (e.g., Si-dominant electrodes) may be activated with [3-(2-aminoethylamino)propyl]trimethoxysilane (AEAPTMS), an $AlF_3$ suspension may be prepared, and subsequently the AEAPTMS treated Si-containing electrode coupon may be dipped in the $AlF_3$ suspension to coat $AlF_3$ on the surface of the Si-containing electrode coupon; and (iii) the Si-containing electrode may be activated by dipping the electrode into AEAPTMS, and subsequently the AEAPTMS-treated Si-containing electrode may be dipped into 0.1 M of $Al(NO_3)_3.9H_2O$ and 0.6 M $NH_4F$ to coat a $AlF_3$ layer on the electrode.

Further electrochemical device advantages of electrodes formed with the artificial SEI layer described may include increased cycle life, increased energy density, increased safety, increased cell performance at high temperature, and decreased electrolyte consumption.

In some embodiments, a method of preparing an electrode is described. FIG. 1 shows an example method. The method 100 can include providing an electrode material comprising silicon, as shown in block 110, and exposing the electrode material to an SEI fluorinating precursor and/or an SEI fluorinating compound, as shown in block 120. The method 100 can also include forming a fluorine-containing layer on the electrode material (e.g., via a chemical reaction with the SEI fluorinating precursor and/or the SEI fluorinating compound) as shown in block 130.

With respect to block 110, the electrode material can comprise silicon. In certain embodiments, the silicon material can be at least partially crystalline, substantially crystalline, and/or fully crystalline. Furthermore, the silicon material may be substantially pure silicon or may be a silicon alloy. In one embodiment, the silicon alloy includes silicon as the primary constituent along with one or more other elements. For example, these elements may include aluminum (Al), iron (Fe), copper (Cu), oxygen (O), or carbon (C).

In some embodiments, the electrode material can comprise silicon powders/particles. For example, the particle size (e.g., diameter or a largest dimension of the silicon particles) can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 50 µm, between about 0.1 µm and about 40 µm, between about 0.1 µm and about 30 µm, between about 0.1 µm and about 20 µm, between about 0.5 µm and about 50 µm, between about 0.5 µm and about 40 µm, between about 0.5 µm and about 30 µm, between about 0.5 µm and about 20 µm, between about 1 µm and about 50 µm, between about 1 µm and about 40 µm, between about 1 µm and about 30 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. All, substantially all, or at least some of the silicon particles may comprise the particle size (e.g., diameter or largest dimension) described above. For example, an average particle size (or the average diameter or the average largest dimension) or a median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 50 µm, between about 0.1 µm and about 40 µm, between about 0.1 µm and about 30 µm, between about 0.1 µm and about 20 µm, between about 0.5 µm and about 50 µm, between about 0.5 µm and about 40 µm, between about 0.5 µm and about 30 µm, between about 0.5 µm and about 20 µm, between about 1 µm and about 50 µm, between about 1 µm and about 40 µm, between about 1 µm and about 30 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. In some embodiments, the silicon particles may have a distribution of particle sizes. For example, at least about 95%, at least about 90%, at least about 85%, at least about 80%, at least about 70%, or at least about 60% of the particles may have the particle size described herein.

With respect to block 120, the method comprises exposing an electrode material to a solid electrolyte interphase (SEI) fluorinating precursor and/or an SEI fluorinating compound. In some embodiments, exposure of the electrode material to the SEI fluorinating precursor and/or the SEI fluorinating compound causes a fluorine-containing layer to form on the electrode material (e.g., block 130). For example, a fluorine-containing layer can form via a chemical reaction with the SEI fluorinating precursor and/or the SEI fluorinating compound. In various embodiments, the fluorine-containing layer on the electrode material can be about 1 nm to about 20 nm thick e.g., about 1 nm to about 15 nm, about 1 nm to about 10 nm, about 3 nm to about 20 nm, about 3 nm to about 15 nm, about 3 nm to about 10 nm, about 4 nm to about 20 nm, about 4 nm to about 15 nm, about 4 nm to about 10 nm, about 5 nm to about 20 nm, about 5 nm to about 15 nm, about 5 nm to about 10 nm, etc.).

In some embodiments, the method comprises activating the electrode material. In some embodiments, activating the electrode material comprises exposing the electrode material to a coupling reagent. In some embodiments, the coupling reagent comprises [3-(2-aminoethylamino)propyl]trimethoxysilane (AEAPTMS). In some embodiments, the electrode material is activated and is subsequently exposed to the SEI fluorinating precursor. In some embodiments, the electrode material is activated and is subsequently exposed to the SEI fluorinating compound.

In some embodiments, the SEI fluorinating precursor and/or the SEI fluorinating compound can include a metal fluoride compound, a fluorine doped metal oxide compound, a fluoropolymer, a Nafion compound, a Li ion exchanged Nafion compound, hexafluorosilicic acid, a fluorinated organophosphine compound, a fluoride molten salt, a fluoride ion solution, $XeF_2$, $F_2$, $SiF_4$, $CF_4$, $Ar/F_2$, or a combination thereof.

In some embodiments, the SEI fluorinating precursor can comprise $Al(NO_3)_3.9H_2O$ and $NH_4F$. In some embodiments, the metal fluoride compound can comprise LiF, $AlF_3$, $CuF_2$, $FeF_3$, $TiF_3$, $FeF_2$, $NiF_2$, $CoF_3$, $CoF_2$, $MnF_2$, $AgCuF_3$, $BiF_3$, $VF_3$, $NbF_5$, etc., or a combination thereof. For example, in some instances, a metal fluoride compound can be coated on Si material (e.g., via direct coating). In some embodiments, the metal fluoride compound is $AlF_3$. In some embodiments, the fluorine doped metal oxide compound can comprise $TiO_xF_y$, $SnO_xF_y$, FeOF, $WO_{(3-x)}F_x$, fluorine doped $SnO_2$, fluorine doped ZnO, or a combination thereof. In some embodiments, the SEI fluorinating precursor can comprise the complex of a glyme and LiF.

In some embodiments, exposing the electrode material to the SEI fluorinating precursor and/or the SEI fluorinating compound can comprise exposure to a solution, electrolysis, exposure to a gas, exposure to a plasma, photochemical synthesis, electrochemical synthesis, magnetron sputtering deposition, or atomic layer deposition. In some embodiments, the electrode material is exposed to a solution (e.g., a hexafluorosilicic acid solution, a molten salt solution, a fluoride ion solution, a Nafion solution, or Li-ion exchanged Nafion solution, a glyme and LiF bi-component-containing solution, etc.). In some instances, electrolysis in molten salts or fluoride ion solutions can introduce fluorine on the Si surface. In some embodiments, exposure to gas comprises exposure to $XeF_2$ or $F_2$ as a fluorine agent. In some embodiments, exposure to gas comprises exposure via a fluidized bed reactor system. In some embodiments, exposure to plasma comprises exposure to $SiF_4$, $CF_4$ and/or $Ar/F_2$ plasma. In some embodiments, the silicon can be exposed to an electrochemical process or a photochemical process. In some embodiments, surface fluorination of a Si anode can be carried out through a photochemical/electrochemical synthesis using CYTOP®, a compound made by Cytec, as a fluorine agent. In some embodiments, magnetron sputtering deposition or atomic layer deposition can coat metal fluoride (e.g., LiF) on the surface of Si material.

In some embodiments, the method can further comprise forming the electrode material into the electrode. The electrodes prepared by the methods described may be used in a number of electrochemical devices. In some embodiments, the electrode can comprise a silicon-containing electrode. For example, the electrode can include from greater than 0% to about 100% by weight of silicon. For example, the amount of silicon by weight of the electrode can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, greater than about 0% to about 99% by weight, from about 10% to about 35% by weight, from about 10% to about 50% by weight, from about 10% to about 90% by weight, from about 10% to about 95% by weight, from about 10% to about 99% by weight, from about 10% to about 100% by weight, from about 30% to about 85% by weight, from about 30% to about 90% by weight, from about 30% to about 95% by weight, from about 30% to about 99% by weight, from about 30% to about 100% by weight, from about 50% to about 85% by weight, from about 50% to about 90% by weight, from about 50% to about 95% by weight, from about 50% to about 99% by weight, from about 50% to about 100% by weight, from about 60% to about 85% by weight, from about 60% to about 90% by weight, from about 60% to about 95% by weight, from about 60% to about 99% by weight, from about 60% to about 100% by weight, from about 70% to about 85% by weight, from about 70% to about 90% by weight, from about 70% to about 95% by weight, from about 70% to about 99% by weight, from about 70% to about 100% by weight, from about 80% to about 90% by weight, from about 80% to about 95% by weight, from about 80% to about 99% by weight, from about 80% to about 100% by weight, etc.).

In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 50% to about 100% by weight of silicon, at least about 60% to about 95% by weight of silicon, at least about 60% to about 99% by weight of silicon, at least about 60% to about 100% by weight of silicon, at least about 70% to about 95% by weight of silicon, at least about 70% to about 99% by weight of silicon, at least about 70% to about 100% by weight of silicon, at least about 80% to about 95% by weight of silicon, at least about 80% to about 99% by weight of silicon, at least about 80% to about 100% by weight of silicon. In some examples, the electrochemically active material can include 100% silicon.

In some instances, the electrode can include the modified silicon powders coated on a current collector. For example, the modified silicon powders can be coated on a current collector with a binder. For instance, the powders can be added to a slurry and coated on a current collector. Additional conductive particles (e.g., graphite, carbon black, etc.) can also be added to the slurry.

In some embodiments, the electrode material can be formed into a film-based electrode. For example, the electrode material can be formed into silicon-carbon composite films fabricated through using the silicon material and carbonized polymer (e.g., a hard carbon). In some instances, after pyrolysis, the fluorine-containing material in the fluorine-containing layer can be dispersed in the electrode. For example, the fluorine-containing layer can include metal fluorides and the metal fluoride can be dispersed in the carbon. In various embodiments, the film-based electrodes may be self-supported structures or attached to a current collector. When attached to a current collector, an attachment substance can be applied using a solution (e.g., a wet process) or applied as in a substantially solid state (e.g., a substantially dry process). In some embodiments, the electrode can comprise graphite. In some embodiments, the electrode can comprise glass carbon (e.g., a hard carbon prepared from carbonization of a polymer). The current collector can be any known in the art or yet to be developed. In some instances, the current collector can comprise a Cu or Ni foil.

In some embodiments, instead of the electrode material being silicon powder/particles, the electrode material can be an electrode, e.g., an electrode coupon. For example, an electrode can be exposed to an SEI fluorinating precursor and/or SEI fluorinating, and fluorine-containing layer can form on the electrode. In various implementations, surface fluorination (e.g., exposure to a solution, electrolysis, exposure to a gas, exposure to a plasma, photochemical synthesis, electrochemical synthesis, etc.) of the electrode material may lead to surface modification of glass carbon and/or graphite components by fluorine. In some implementations, the fluoride-containing layer can be coated onto the electrode via magnetron sputtering deposition, atomic layer deposition, etc. In some instances, the electrode is a silicon-containing electrode. In some instances, the electrode is a silicon-dominant electrode (e.g., comprising silicon-dominant electrochemically active material).

In some embodiments, the electrodes can be used in any electrochemical device known in the art or yet to be developed. For example, the electrochemical device can include a first electrode comprising silicon and a fluorine-containing layer, a second electrode, and an electrolyte. In various instances, the first electrode can include silicon-dominant electrochemically active material. The first electrode can comprise an anode. The second electrode can comprise a cathode comprising a cathode ion. In some embodiments, the cathode ions can include $Li^+$, $Na^+$, $K^+$, or mixtures thereof. In some embodiments, the cathode ions can comprise $Li^+$. In some embodiments, the cathode ion can be $Li^+$. In some embodiments, the cathode can comprise $LiCoO_2$. In some embodiments, the cathode can comprise about 97 wt % $LiCoO_2$. In some embodiments, the cathode can be a film based electrode. In some embodiments, the cathode can be a layered Nickel-Cobalt-Manganese (NCM) or Nickel-Cobalt-Aluminum (NCA) cathode. In some embodiments, the cathode can include a lithium rich oxide, a nickel-rich oxide, a high-voltage cathode material, a lithium rich layered oxide, a nickel-rich layered oxide, a high-voltage spinel oxide, and/or a high-voltage polyanionic compound. Lithium rich oxides may include $Li_2MnO_3 \cdot (1-x)LiNi_aCo_bMn_cO_2$. Nickel-rich layered oxides may include $LiNi_{1-x}M_xO_2$, where M comprises Co, Mn, Al, or others). Lithium rich layered oxides may include $LiNi_{1+x}M_{1-x}O_2$, where M comprises Co, Mn, Ni, or others). High-voltage spinel oxides may include $LiNi_{0.5}Mn_{1.5}O_4$. High-voltage polyanionic compounds may include phosphates, sulfates, silicates, etc. In some instances, high-voltage may refer to at least 4.7V, 5V, etc. In some embodiments, the cathode can comprise carbon black (e.g., Super P). In some embodiments, the cathode can comprise a binder (e.g., PVDF5130). In some embodiments, the cathode can comprise a current collector (e.g., Al foil). As an example, the cathode active material can be mixed with carbon black and binder to prepare a slurry. The slurry can be coated on the surface of the current collector. The solvent can be dried from the coated current collector to form a cathode. Other examples are possible.

In some embodiments, the electrochemical device can comprise any electrolyte known in the art or yet to be developed. In some embodiments, the electrolyte can comprise fluoroethylene carbonate (FEC), ethyl methyl carbonate (EMC), dimethyl carbonate (DMC), diethyl carbonate (DEC), propylene carbonate (PC), other partially or fully fluorinated linear or cyclic carbonates, or mixtures thereof. In some embodiments, the electrolyte can comprise FEC or EMC, or mixtures thereof. In some embodiments, the electrolyte can comprise greater than or equal to about 10 wt % FEC, EMC, DMC, DEC, PC or others, or mixtures thereof. In some embodiments, the electrolyte can comprise greater than or equal to about 10 wt % FEC or EMC, or mixtures thereof. In some embodiments, the electrolyte can comprise about 30 wt % FEC, about 35 wt % DEC and about 35 wt % EMC. In some embodiments, the electrolyte can comprise about 30 wt % FEC and about 70 wt % EMC. In some embodiments, the electrolyte may or may not comprise ethylene carbonate (EC). In some embodiments, the electrolyte can comprise $LiPF_6$. In some embodiments, the electrolyte can comprise $LiPF_6$ at a concentration of about 1 M, 1.2 M, or any concentration between 1 M and 1.2 M. In addition, the $LiPF_6$ salt can be mixed together with a certain amounts of other Li salts, such as lithium tetrafluoroborate ($LiBF_4$), lithium hexafluoroarsenate monohydrate ($LiAsF_6$), lithium bis(trifluoromethanesulfonyl)imide (LiTFSI), lithium bis(fluorosulfonyl)imide (LiFSI), lithium difluoro (oxalate)borate (LiDFOB), and lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), lithium 2-trifluoromethyl-4,5-dicyanoimidazole (LiTDI), etc. In some embodiments, the electrolyte can comprise some additives, including any of the above-mentioned Li salt-based additives. In some embodiments, the electrolyte can comprise LiF.

In some embodiments, the electrochemical device can be a battery, e.g., a Li-ion battery.

EXAMPLES

Synthesis of $AlF_3$ coated Si powder $AlF_3$ coated Si powders were prepared as follows. A mixture of 60 ml [3-(2-aminoethylamino)propyl]trimethoxysilane (AEAPTMS), 600 g Si powder, and 6000 ml DI water were mixed and stirred for 8 hours at room temperature. After reaction, the solution was filtered and dried in a vacuum oven at 80° C. for 12 hours. Subsequently, 651 ml 0.1M of $Al(NO_3)_3 \cdot 9H_2O$ aqueous solution were mixed together with 300 g of the AEAPTMS treated Si powder, and then 324 ml 0.6M $NH_4F$ aqueous solution was added to the as-prepared solution. All mixtures were continuously stirred at 80° C. for 24 hours and dried in a vacuum oven at 80° C. for 12 hours to obtain thin $AlF_3$-coated Si powder.

Results Using $AlF_3$ Coated Si Powder

FIGS. 2A-5B demonstrate tests of 1.2M $LiPF_6$ in FEC/EMC (3/7 wt %) electrolytes and evaluation of their electrochemical performance in silicon-dominant anode//$LiCoO_2$ cathode full cells, wherein the silicon-dominant anodes are prepared with $AlF_3$-coated Si powders as described above.

The charge capacity (dQ/dV) data for $AlF_3$-coated Si powder processed cells were obtained through the following testing protocol: Rest 5 minutes, charge at 0.025 C to 25% nominal capacity, charge at 0.2 C to 4.3 V until 0.05 C, rest 5 minutes, discharge at 0.2 C to 3.3 V, rest 5 minutes.

The long-term cycling for $AlF_3$-coated Si powder processed cells include: (i) At the $1^{st}$ cycle, charge at 0.5 C to 4.3 V for 5 hours, rest 5 minutes, 1 ms internal resistance (IR), 100 ms IR, discharge at 0.2 C to 2.75 V, rest 5 minutes, 1 ms IR, 100 ms IR; and (ii) from the $2^{nd}$ cycle, charge at 1 C to 4.3 V until 0.05 C, rest 5 minutes, 1 ms IR, 100 ms IR, discharge at 0.5 to 3.3 V, rest 5 minutes, 1 ms IR, 100 ms IR. After each 49 cycles, the test conditions in the $1^{st}$ cycle were repeated.

In addition, $AlF_3$-coated Si powder processed cells were formatted for 6 cycles at the following conditions before long-term cycling: (i) At the $1^{st}$ cycle, Rest 5 minutes, charge at 0.025 C to 25% nominal capacity, charge at 0.2 C to 4.3 V until 0.05 C, rest 5 minutes, discharge at 0.2 C to 3.3 V, rest 5 minutes; and (ii) from $2^{nd}$ to $6^{th}$ cycles, charge at 0.5 C to 4.3 V until 0.05 C, rest 5 minutes, discharge at 0.5 C to 3.3 V, rest 5 minutes.

The Resistance (Res) fields are values that were calculated using data points of voltage and current. The method linearly interpolated for a voltage at 10 s or 30 s in the charge/discharge step between the two data points before and after that time. Then, the method took the difference between that voltage and the last voltage during rest when current is 0 and divided it by the charge or discharge current. Res 10 s C were calculated using discharge data (for the charged state). Res 10 s DC were calculated using charge data (for the cell state at the beginning of the cycle). Res 30 s C was calculated using discharge data (for the charged state). Res 30 s DC was calculated using charge data (for the cell state at the beginning of the cycle).

Figure 2A:
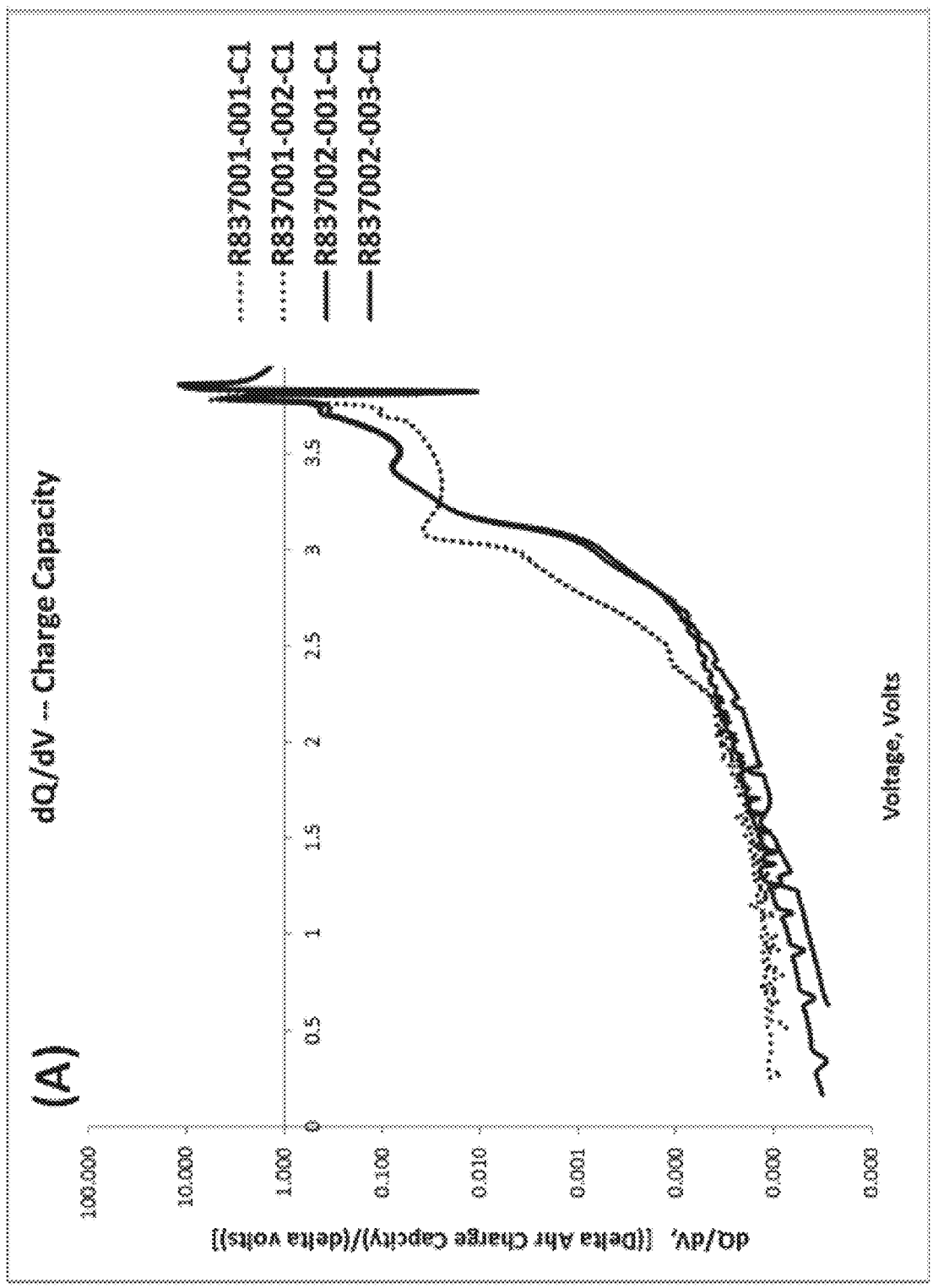
FIG. 2A shows the charge capacity as a function of voltage of a battery in one embodiment compared to a control battery.
Figure 2B:
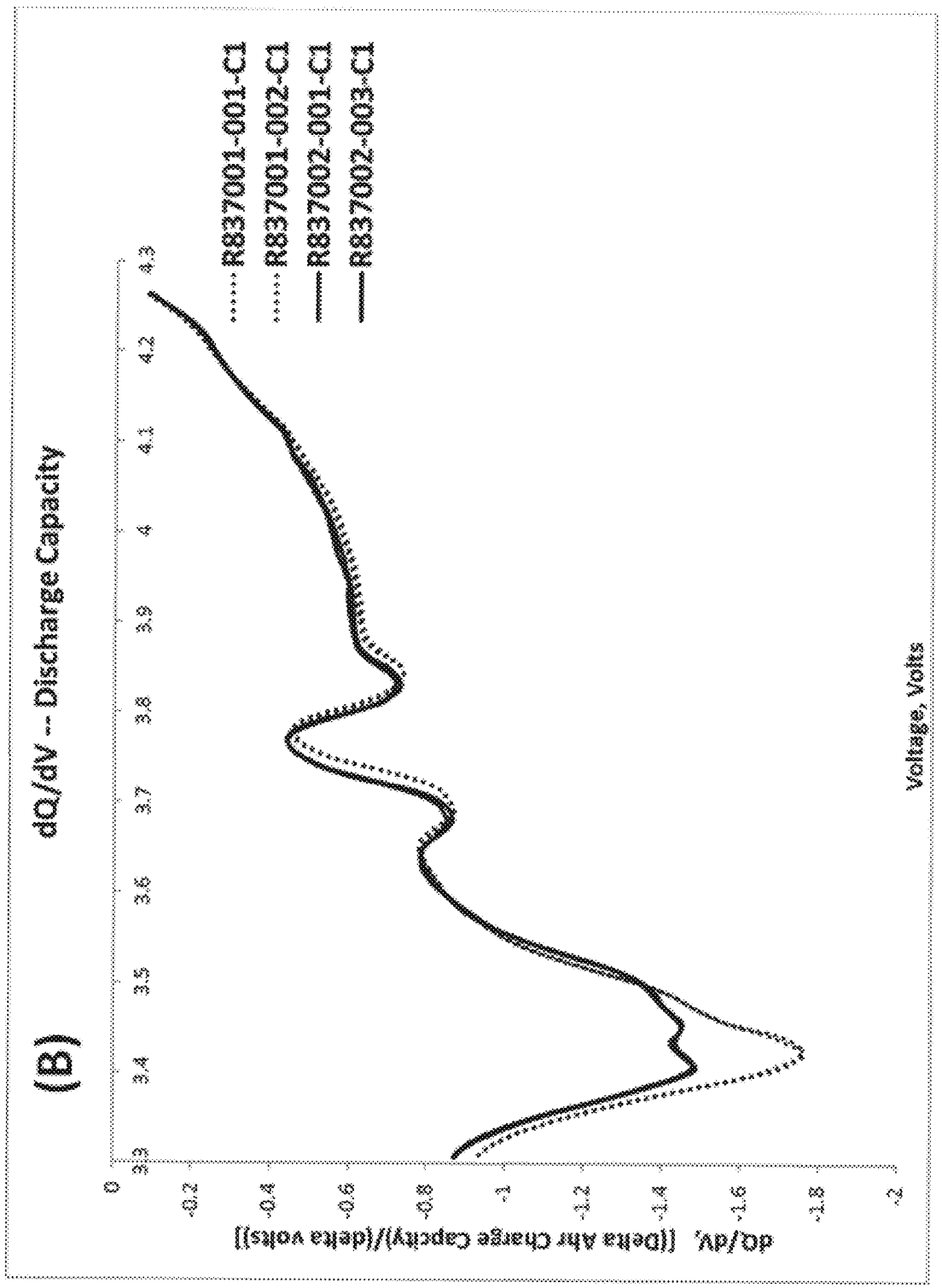
FIG. 2B shows the discharge capacity retention as a function of voltage of a battery in one embodiment compared to a control battery.

FIG. 2A demonstrates the charge capacity as a function of voltage and FIG. 2B demonstrates the discharge capacity as a function of voltage of a control battery (shown as a dotted line), and a battery with an anode prepared from $AlF_3$-coated Si powder (shown as a solid line). The $1^{st}$ formation cycle dQ/dV curves in FIGS. 2A-2B demonstrate that the battery with an anode prepared from $AlF_3$-coated Si powder show a reduction peak at around 2.75 V (due to the reduction of FEC) that is still present in $AlF_3$ coated Si-dominant anode-based system. This indicates that $AlF_3$ coating has little influence on electrolyte solvent reduction.

Figure 3A:
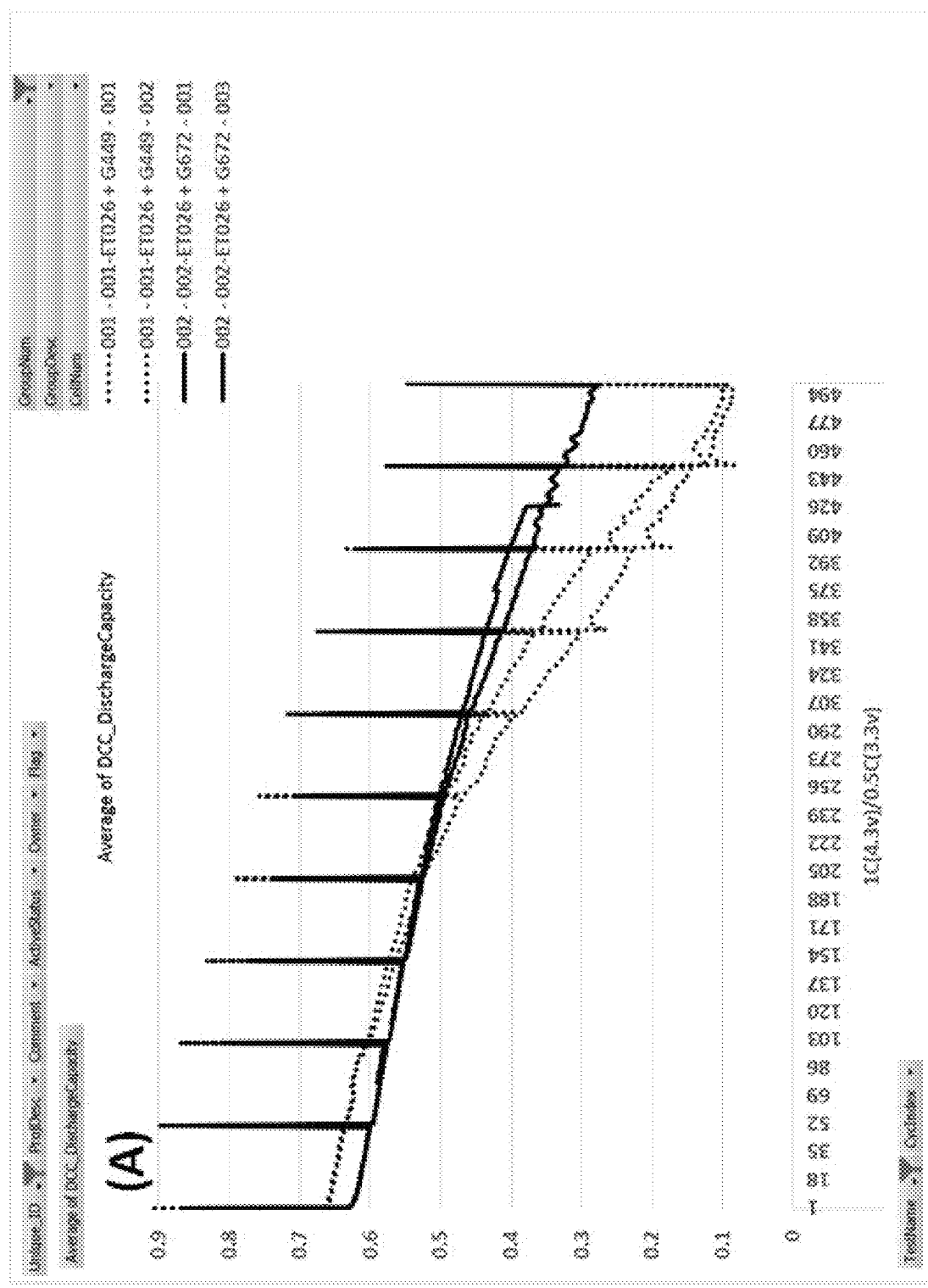
FIG. 3A shows the capacity as a function of cycles of a battery in one embodiment compared to a control battery.
Figure 3B:
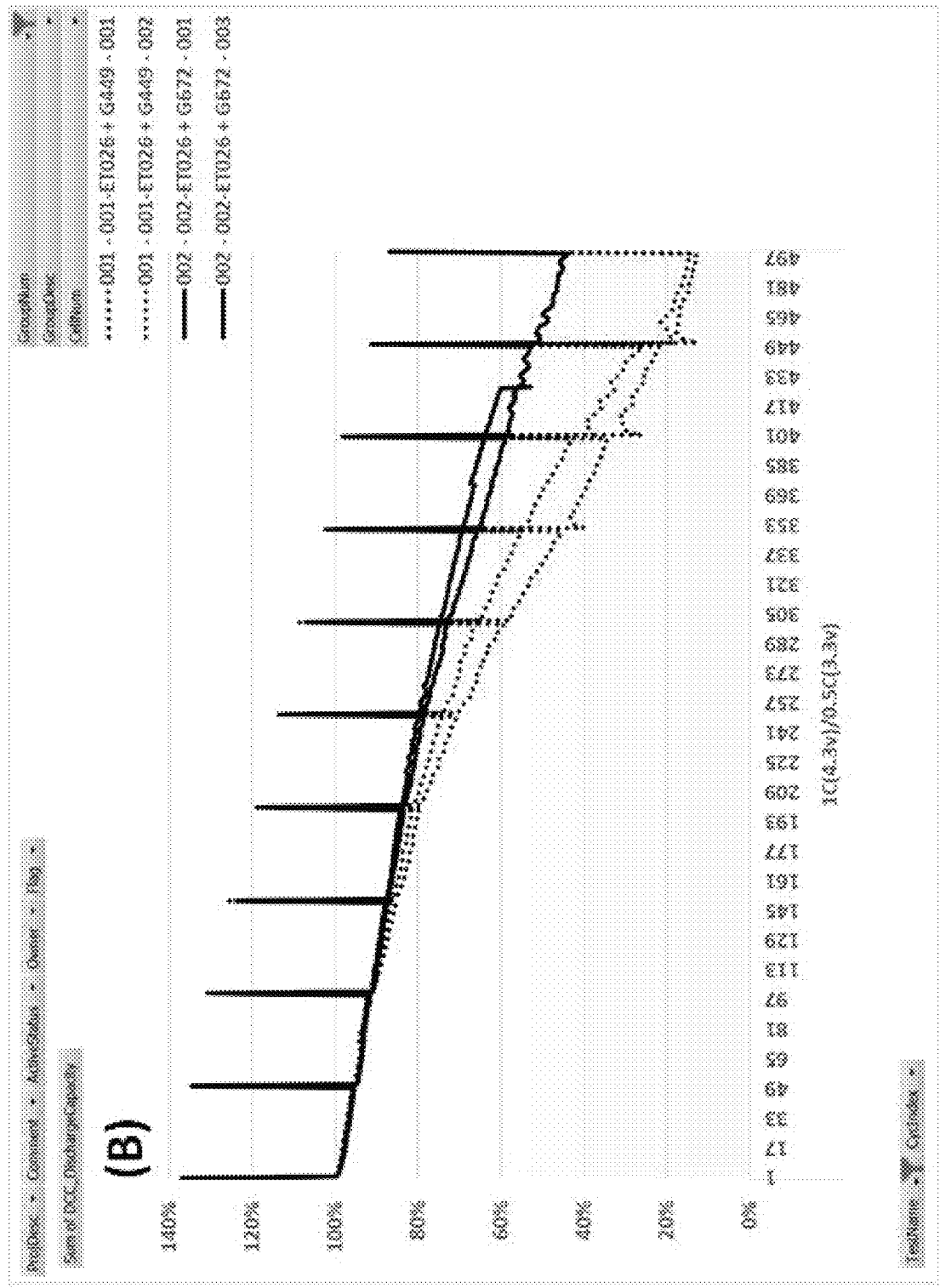
FIG. 3B shows the capacity retention as a function of cycles of a battery in one embodiment compared to a control battery.

FIG. 3A demonstrates the capacity as a function of cycles and FIG. 3B demonstrates the capacity retention as a function of cycles of a control battery (shown as a dotted line), and a battery with an anode prepared from $AlF_3$-coated Si powder (shown as a solid line). The results of FIGS. 3A-3B demonstrate that a battery with an anode prepared from $AlF_3$-coated Si powder improves initial capacity and capacity retention. Overall, coating an $AlF_3$ thin layer on the surface of Si powder can be beneficial for the overall performance improvement in Li-ion batteries after about 450 cycles.

Figure 4A:
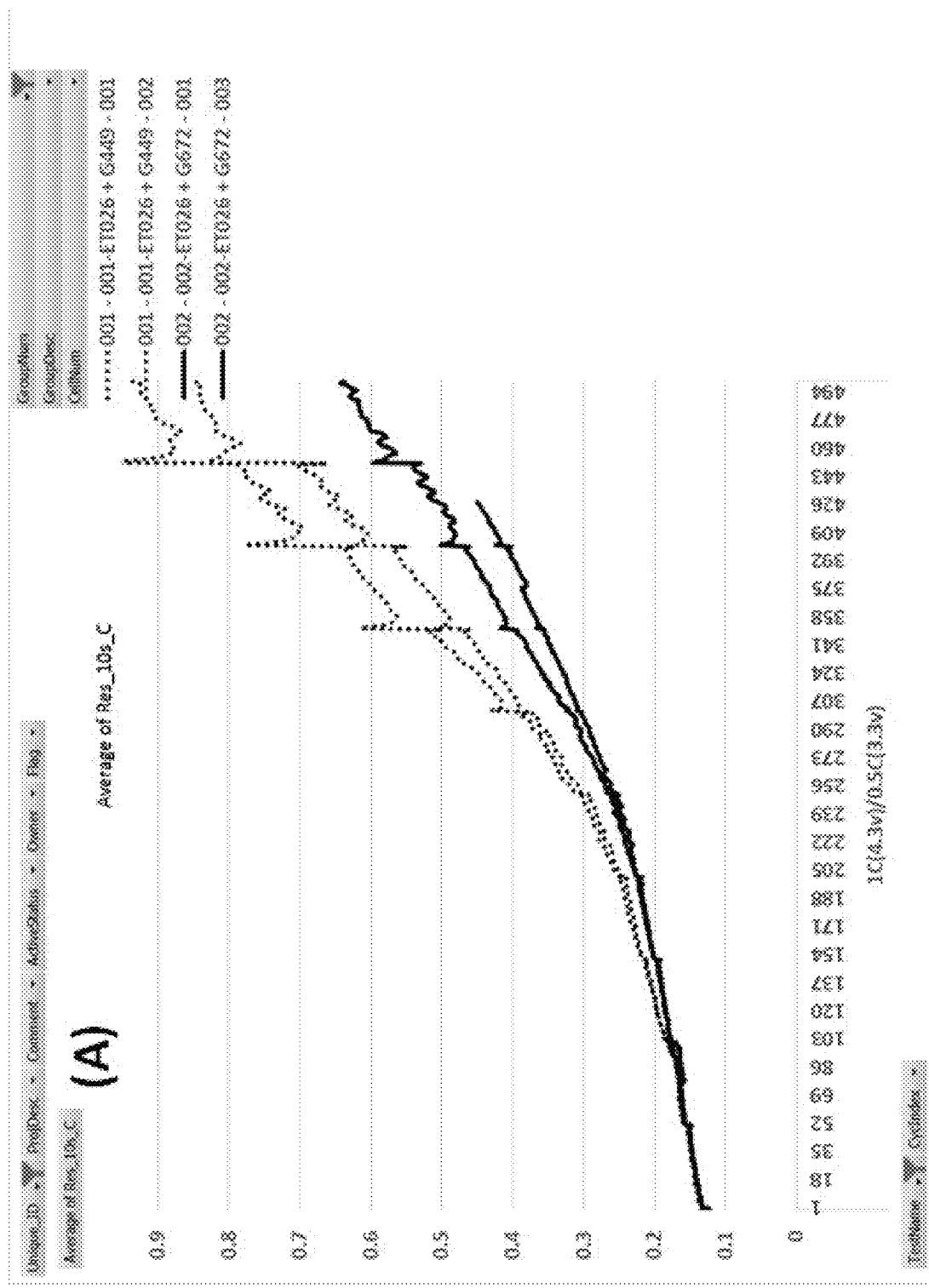
FIG. 4A shows the average resistance as a function of cycles after 10 s charge of a battery in one embodiment compared to a control battery.
Figure 4B:
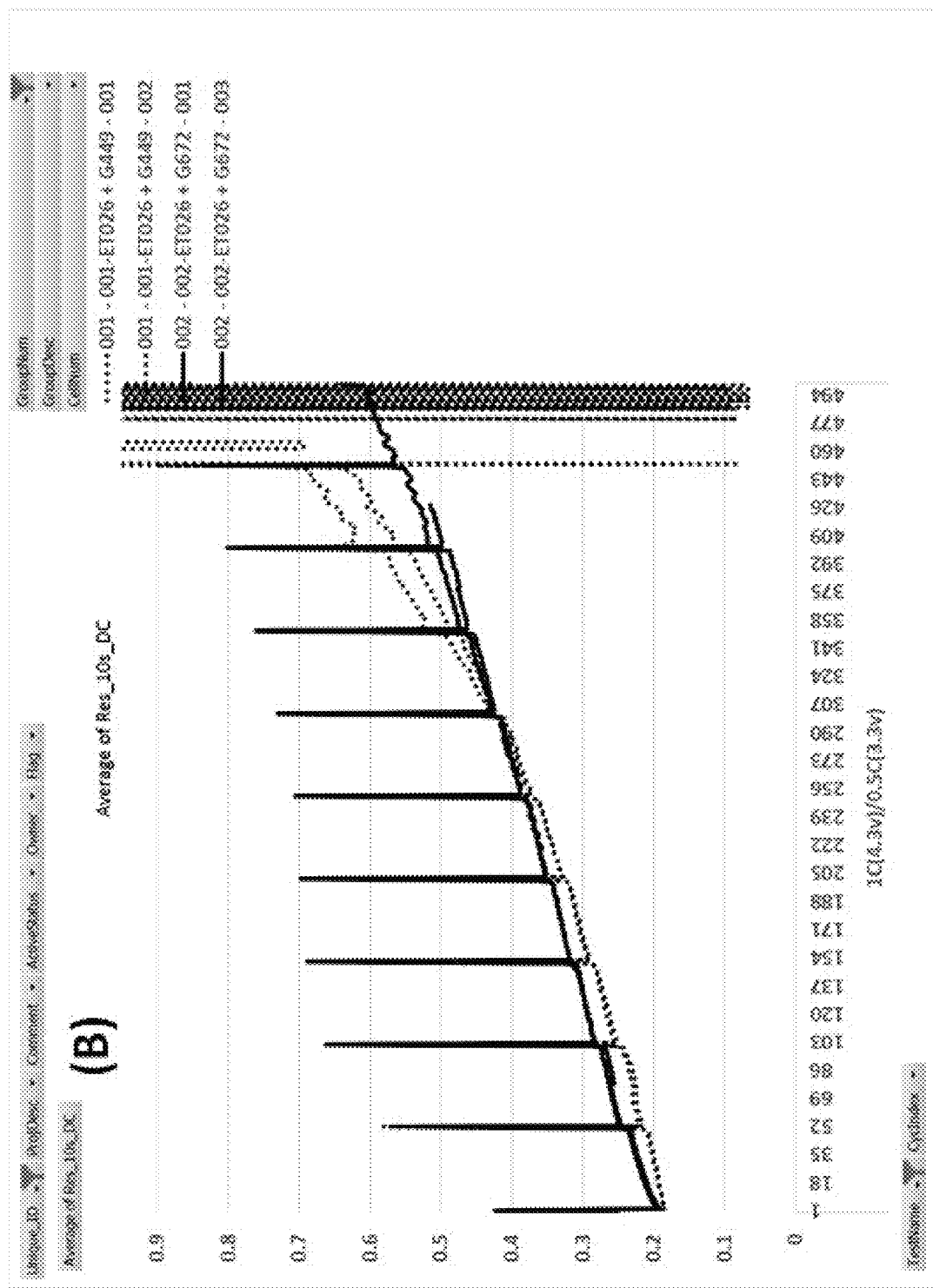
FIG. 4B shows the average resistance as a function of cycles after 10 s discharge of a battery in one embodiment compared to a control battery.

FIG. 4A demonstrates the average resistance as a function of cycles after 10 s charge and FIG. 3B demonstrates the average resistance as a function of cycles after 10 s discharge processes of a control battery (shown as a dotted line), a battery with an anode prepared from $AlF_3$-coated Si powder (shown as a solid line). The results of FIGS. 4A-4B demonstrate that the anode prepared from $AlF_3$-coated Si powder has lower average resistance after a 10 s charge/discharge processes than control devices after about 300 cycles.

Figure 5A:
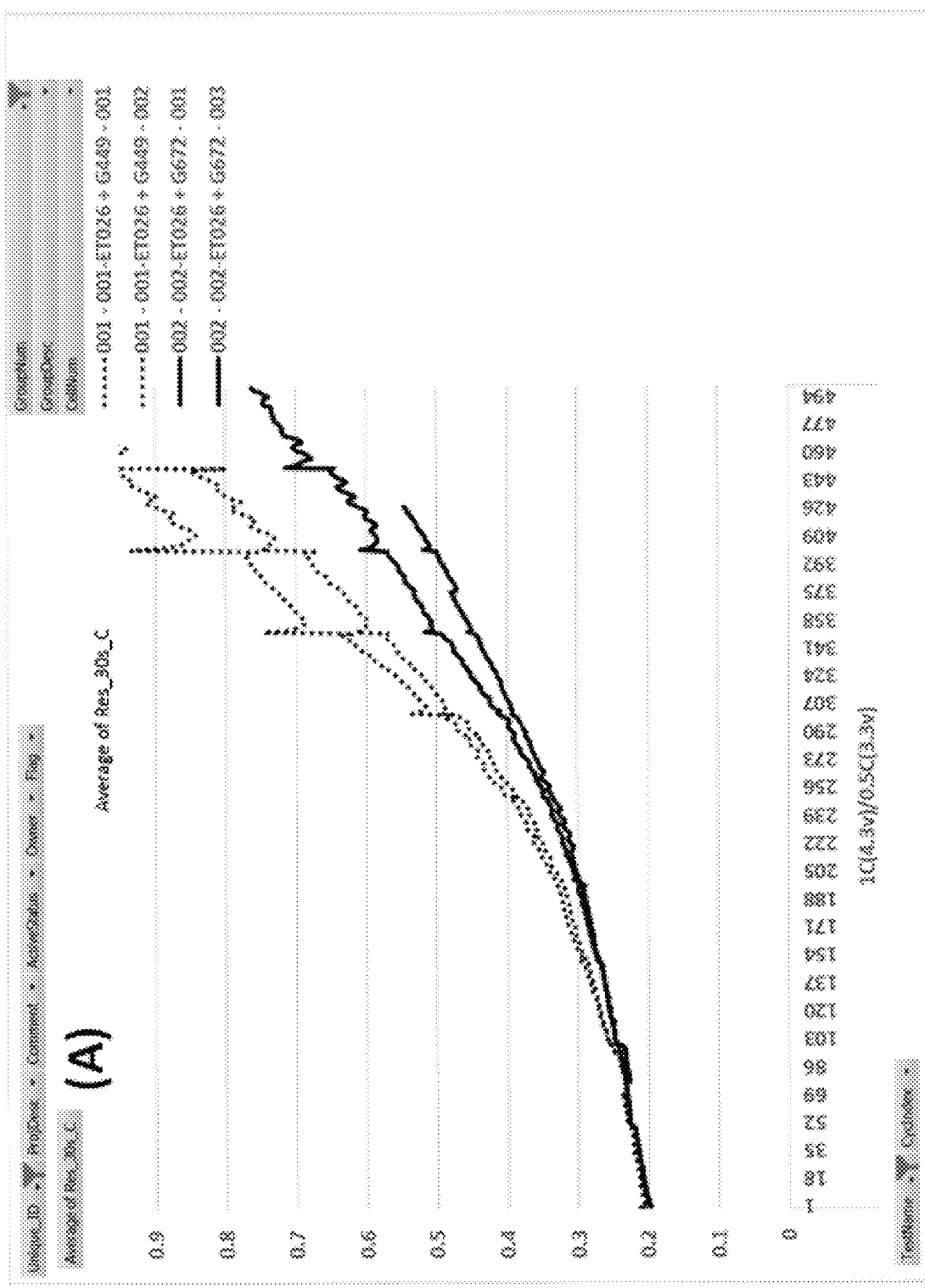
FIG. 5A shows the average resistance as a function of cycles after 30 s charge of a battery in one embodiment compared to a control battery.
Figure 5B:
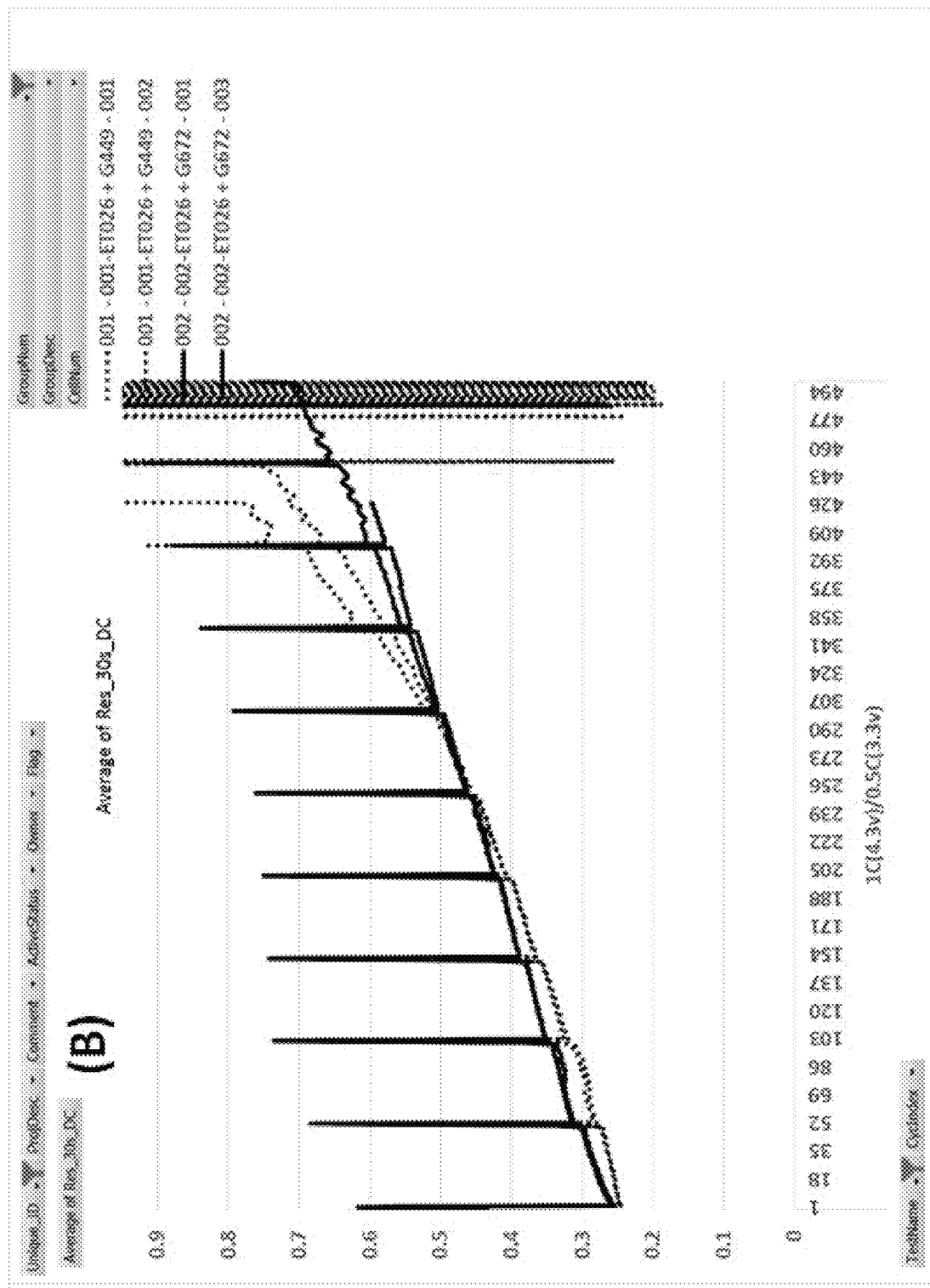
FIG. 5B shows the average resistance as a function of cycles after 30 s discharge of a battery in one embodiment compared to a control battery.

FIG. 5A demonstrates the average resistance as a function of cycles after 30 s charge and FIG. 5B demonstrates the average resistance as a function of cycles after 30 s discharge processes of a control battery (shown as a dotted line), a battery with an anode prepared from $AlF_3$-coated Si powder (shown as a solid line). The results of FIGS. 5A-5B demonstrate that an anode prepared from $AlF_3$-coated Si powder has lower average resistance after a 30 s charge/discharge processes than control devices after about 300 cycles.

What is claimed is:

1. An electrochemical device comprising:
    an anode comprising a silicon-dominant electrochemically active material comprising silicon particles;
    a coupling reagent; and
    a fluorine-containing layer; wherein said layer comprises a metal fluoride compound and wherein said metal fluoride compound comprises $LiF$, $AlF_3$, $CuF_2$, $FeF_3$, $TiF_3$, $FeF_2$, $NiF_2$, $CoF_3$, $CoF_2$, $MnF_2$, $AgCuF_3$, $BiF_3$, $VF_3$, $NbF_5$, or a combination thereof;
    a cathode; and
    an electrolyte, wherein said electrolyte comprises fluoroethylene carbonate (FEC), ethyl methyl carbonate (EMC), or a mixture thereof; and
    wherein said coupling reagent couples said fluorine-containing layer to said silicon particles.

2. The electrochemical device of claim 1, wherein the electrochemically active material comprises silicon at about 70% to about 100% by weight.

3. The electrochemical device of claim 1, wherein the electrochemically active material comprises silicon particles, and the silicon particles are coated with the fluorine-containing layer.

4. The electrochemical device of claim 3, wherein the silicon particles have an average particle size between 1 μm and 50 μm.

5. The electrochemical device of claim 1, wherein the electrochemically active material comprises a film, and the film is coated with the fluorine-containing layer.

6. The electrochemical device of claim 1, wherein the metal fluoride compound comprises $AlF_3$.

7. The electrochemical device of claim 1, wherein the anode comprises a Si-composite electrochemically active film.

8. The electrochemical device of claim 1, wherein the anode is a self-supported film.

9. The electrochemical device of claim 1, wherein said fluorine-containing layer is formed via a chemical reaction with a solid electrolyte interphase (SEI) fluorinating precursor and/or an SEI fluorinating compound.

10. The electrochemical device of claim 1, wherein electrochemically active material is activated.

11. The electrochemical device of claim 10, wherein activating the electrochemically active material comprises exposing the electrochemically active material to a coupling reagent.

12. The electrochemical device of claim 11, wherein the coupling reagent comprises [3-(2-Aminoethylamino)propyl]trimethoxysilane (AEAPTMS).

13. The electrochemical device of claim 10, wherein the electrochemically active material is activated and is subsequently exposed to a SEI fluorinating precursor.

14. The electrochemical device of claim 10, wherein the electrochemically active material is activated and is subsequently exposed to a SEI fluorinating compound.

15. The electrochemical device of claim 9, wherein the SEI fluorinating precursor and/or the SEI fluorinating compound comprises said metal fluoride compound.

16. The electrochemical device of claim 15, wherein the SEI fluorinating precursor comprises $Al(NO_3)_3 \cdot 9H_2O$ and $NH_4F$.

17. The electrochemical device of claim 15, wherein the metal fluoride compound comprises $AlF_3$.

18. The electrochemical device of claim 1, wherein the cathode comprises lithium.

19. The electrochemical device of claim 1, wherein the electrolyte comprises greater than or equal to about 10 wt % FEC, EMC, DMC, DEC, PC, or a mixture thereof.

20. The electrochemical device of claim 19, wherein the electrolyte comprises about 30 wt % FEC and about 70 wt % EMC.

21. The electrochemical device of claim 1, wherein the electrolyte does not comprise ethylene carbonate (EC).

22. The electrochemical device of claim 1, wherein the electrolyte comprises $LiPF_6$.

23. The electrochemical device of claim 22, wherein the electrolyte comprises the $LiPF_6$ at a concentration of about 1 M to about 1.2 M.

24. The electrochemical device of claim 1, wherein the cathode comprises $LiCoO_2$.

25. The electrochemical device of claim 1, wherein cathode comprises Nickel-Cobalt-Manganese (NCM), Nickel-Cobalt-Aluminum (NCA), or a combination thereof.

26. The electrochemical device of claim 1, wherein the electrochemical device is a battery.

* * * * *